United States Patent
Kant et al.

(10) Patent No.: US 8,477,785 B2
(45) Date of Patent: Jul. 2, 2013

(54) METHOD AND SYSTEM FOR INTERWORKING A WLAN INTO A WWAN FOR SESSION AND MOBILITY MANAGEMENT

(75) Inventors: Nishi Kant, Fremont, CA (US); Heeseon Lim, Cupertino, CA (US); Yogesh B. Bhatt, Santa Clara, CA (US)

(73) Assignee: Stoke, Inc., Santa Clara, CA (US)

( * ) Notice: Subject to any disclaimer, the term of this patent is extended or adjusted under 35 U.S.C. 154(b) by 180 days.

(21) Appl. No.: 13/177,353

(22) Filed: Jul. 6, 2011

(65) Prior Publication Data

US 2012/0008578 A1    Jan. 12, 2012

Related U.S. Application Data

(60) Provisional application No. 61/363,194, filed on Jul. 9, 2010.

(51) Int. Cl.
*H04L 12/28* (2006.01)

(52) U.S. Cl.
USPC ............................. 370/392; 370/401; 370/338

(58) Field of Classification Search
None
See application file for complete search history.

(56) References Cited

U.S. PATENT DOCUMENTS

| | | | | |
|---|---|---|---|---|
| 7,965,693 B2 * | 6/2011 | Jiang et al. | | 370/338 |
| 8,064,417 B2 * | 11/2011 | Maki | | 370/338 |
| 8,315,230 B2 * | 11/2012 | Todd et al. | | 370/331 |
| 8,331,340 B2 * | 12/2012 | Lazaridis et al. | | 370/338 |
| 2004/0028009 A1 | 2/2004 | Dorenbosch et al. | | |
| 2008/0101291 A1 * | 5/2008 | Jiang et al. | | 370/331 |
| 2011/0093922 A1 * | 4/2011 | Crosswy et al. | | 726/3 |

OTHER PUBLICATIONS

PCT International Search Report for related PCT Application No. PCT/US2011/043230, Oct. 10, 2011, 5 pgs.
PCT Written Opinion of the International Searching Authority for related PCT Application No. PCT/US2011/043230, Oct. 10, 2011, 11 pgs.
Song et al., "Hybrid Coupling Scheme for UMTS and Wireless LAN Interworking", 58th IEEE Vehicular Technology Conference, Oct. 6, 2003, pp. 2247-2251, vol. 4, IEEE Piscataway, New Jersey, USA.
Chen et al., "Performance Analysis of a Mobility Gateway for GPRS-WLAN Integration", 60th IEEE Vehicular Technology Conference, Sep. 26, 2004, pp. 4476-4480, vol. 6, IEEE Piscataway, New Jersey, USA.

* cited by examiner

*Primary Examiner* — Duc C Ho
(74) *Attorney, Agent, or Firm* — Blakely, Sokoloff, Taylor & Zafman LLP

(57) ABSTRACT

According to one aspect, a mobility gateway device (MGW) receives a request from a wireless local area network (WLAN) controller of a WLAN for accessing the Internet or a packet core network, where the request is originated from a user equipment communicatively coupled to the WLAN. In response to the request, the MGW is configured to determine whether there is an active session associated with the UE over a wireless wide area network (WWAN). If so, the MGW assigns an IP address to the UE that was assigned to the UE during the active session of the WWAN. The assigned IP address is used by the UE to access the Internet or the packet core network over the WLAN.

20 Claims, 11 Drawing Sheets

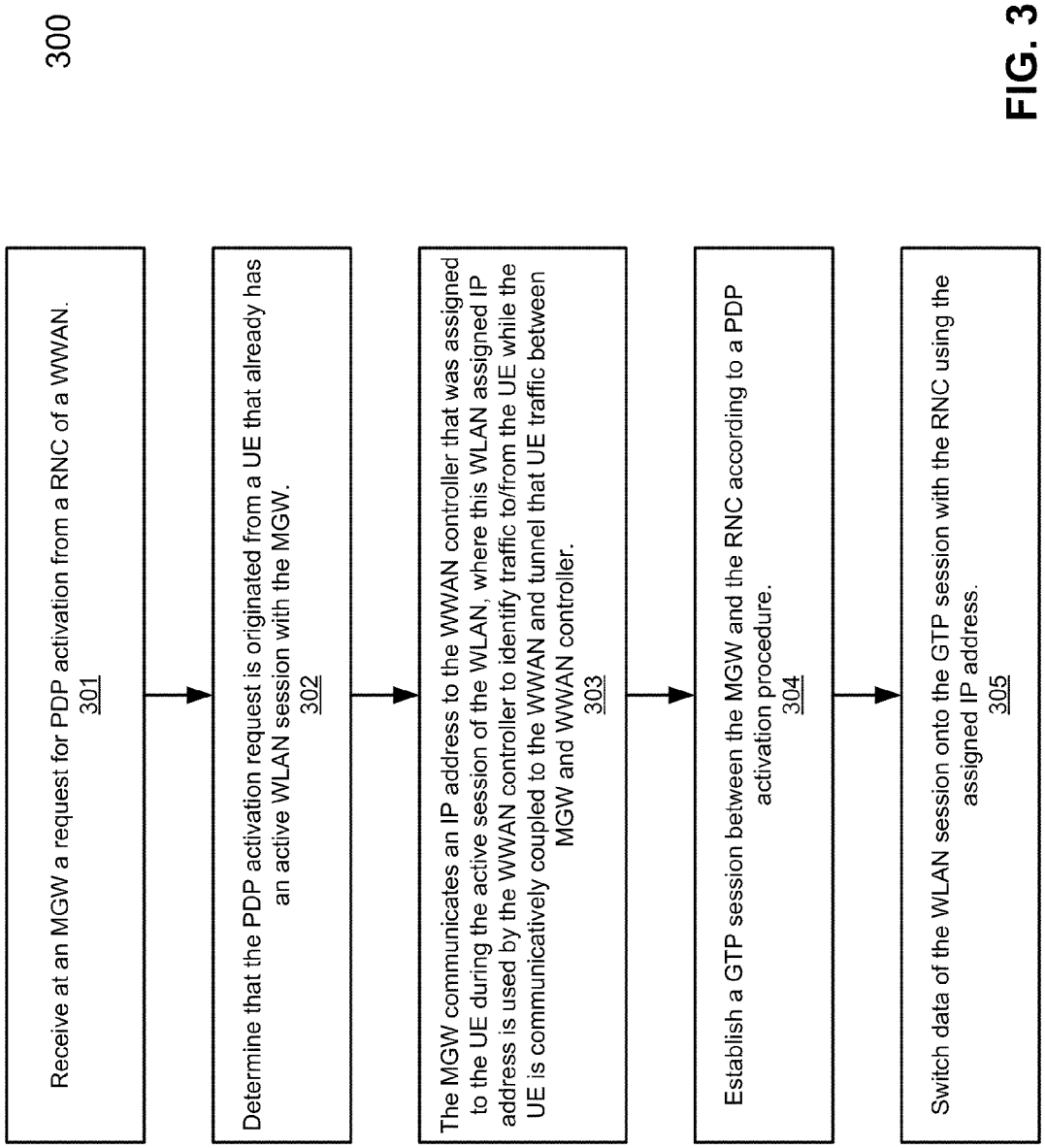

| UE IDs 501 | NAI IDs 502 | MGW IP Address 503 | SGSN IP Address 504 |
|---|---|---|---|
| IMSI 1 | AT & T | ... | ... |
| IMSI 2 | Verizon | ... | ... |
| ... | ... | ... | ... |
| IMSI N | T-Mobile | ... | ... |

| UE IDs 701 | WLAN IP Address 702 | Macro IP Address 703 |
|---|---|---|
| IMSI 1 | | |
| IMSI 2 | | |
| ... | ... | ... |
| IMSI N | | |

METHOD AND SYSTEM FOR INTERWORKING A WLAN INTO A WWAN FOR SESSION AND MOBILITY MANAGEMENT

RELATED APPLICATIONS

This application claims the priority of U.S. Provisional Patent Application No. 61/363,194, filed Jul. 9, 2010, which is incorporated by reference herein in its entirety.

FIELD OF THE INVENTION

The present invention relates generally to packet networks. More particularly, this invention relates to a method for session and mobility management between a wireless local area network (WLAN) and a wireless wide area network (WWAN).

BACKGROUND

In the last decade the Wi-Fi has become the networking technology of choice at home and at enterprises for wireless users. It is also abundantly present at locations of nomadic computing such as cafes, airports and hotels. The umbrella wireless coverage is usually from macro-cellular network but the cost of carrying wireless data is significantly higher on macro-cellular network.

Many modern devices used by mobile user base (e.g., Smartphone, tablet, and laptop) are capable of using both Wi-Fi and cellular network. So it would seem logical to provide a seamless connectivity service that uses these complementary networks efficiently. Under the umbrella of fixed mobile convergence, there have been many efforts by the industry and by standards bodies to address this need. The interworked WLAN (IWLAN) is one such effort that is standardized by the third generation partnership project (3GPP). Even though IWLAN is an end to end solution complete with standardized architecture and protocols, it has basic shortcomings on the end user device implementation and the user experience aspects. That has limited its usefulness in practical deployment.

As the packet data traffic on a macro-cellular network continues to rise and ruggedized Wi-Fi access points have become available for outdoor use, with these developments, the urgency and the ability of Wi-Fi to complement macro-cellular has increased considerably. Moreover, mobile operators can simply use a service set identifier (SSID) on a campus wide Wi-Fi deployment. Large Wi-Fi deployments have moved away from ad-doc stringing of cheap access points to more sophisticated, high performance and distributed Wi-Fi systems and centralized controller with sophisticated algorithms for power and interference management.

Whenever a wireless node attaches to a network, it must get authenticated, authorized and the network must remain aware of its point of attachment. In simple terms a wireless session needs to be established from the mobile device to the network. Depending on the coverage area of the service, the network must keep track of user's point of attachment (mobility management). It must also provide a topologically correct IP path to the mobile node for the user data flows. When Wi-Fi and macro-cellular 3G network operate in a disjointed manner, not only these function are executed in duplicative manner, user does not get benefit of seamlessness either.

SUMMARY OF THE DESCRIPTION

According to one aspect, a mobility gateway device (MGW) receives a request from a wireless local area network (WLAN) controller of a WLAN for accessing the Internet or a packet core network, where the request is originated from a user equipment communicatively coupled to the WLAN. In response to the request, the MGW is configured to determine whether there is an active session associated with the UE over a wireless wide area network (WWAN). In one embodiment, the MGW communicates an IP address to the WLAN controller that was assigned to the user equipment during the active session of the WWAN, where this WWAN assigned IP address is used by the WLAN controller to identify the traffic to/from the UE while the UE is communicatively coupled to the WLAN and tunnel that UE traffic between the MGW and the WLAN controller.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

FIG. 3 is a flow diagram illustrating a method for seamlessly processing handover from a WLAN and a WWAN according to one embodiment of the invention.

FIG. 5 is a block diagram illustrating a data structure representing an IP address mapping table according to one embodiment of the invention.

FIG. 7 is a block diagram illustrating a data structure representing an IP address mapping table according to another embodiment of the invention.

DETAILED DESCRIPTION

Figure 1:
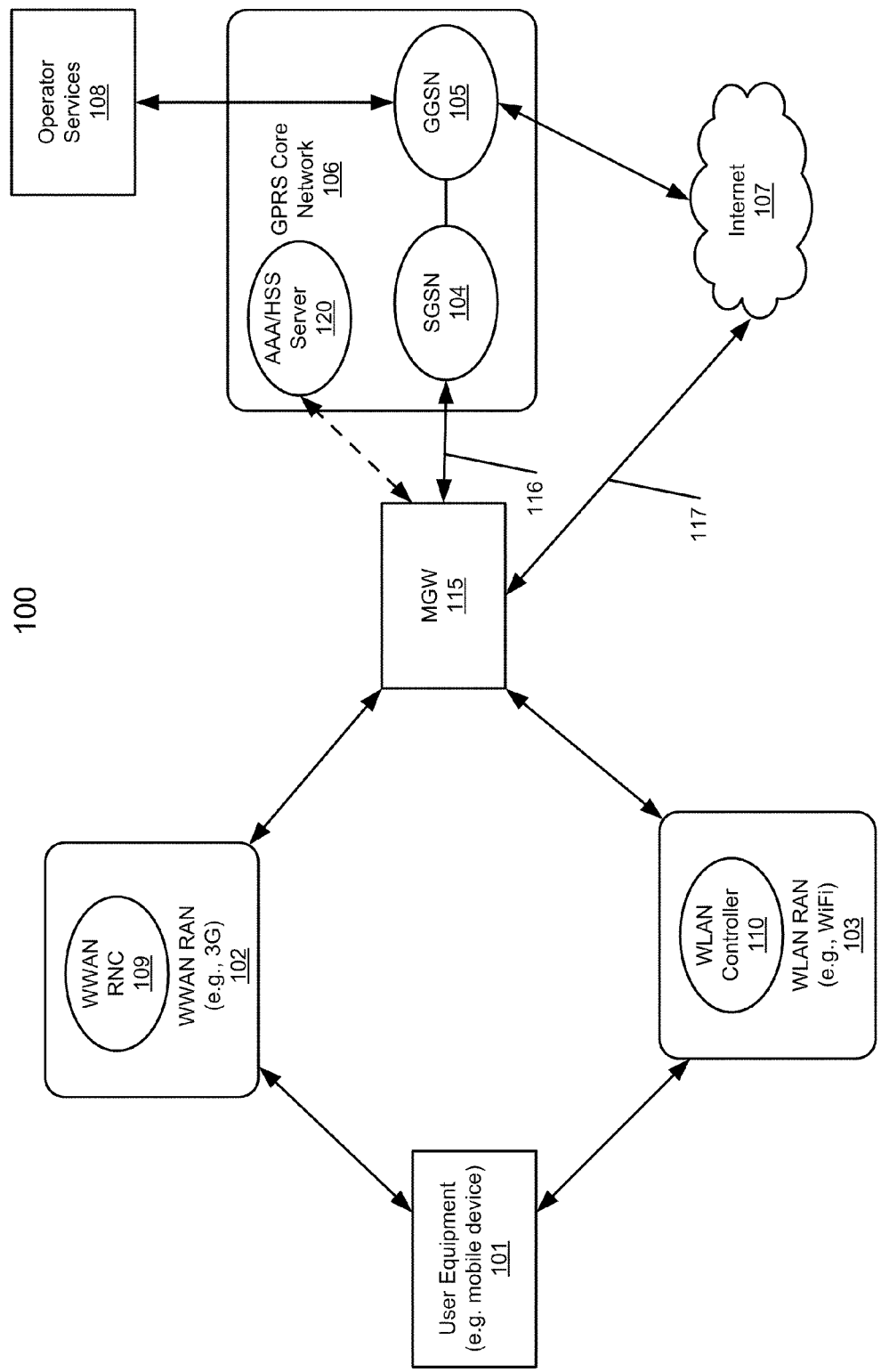
FIG. 1 is a block diagram illustrating an interworked WLAN and WWAN system according to one embodiment.

In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention. Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

According to some embodiments of the invention, an embodiment of the invention provides an architecture and a set of mechanism to combine the session management capabilities of each network and create overall seamless user experience. The mechanism may require capabilities in a WLAN controller, such as a Wi-Fi controller, to interact with a mobility gateway (MGW) coupling a WLAN with the Internet or a packet core network. However, the WLAN entity in the user device does not have to change the way it communicates with another entity. Nor would there be a burden on the user device to run an end-to-end IPSec tunnel with a 3GPP network (also simply referred to as a 3G network). Each network operates in its native manner while the correlation and interworking responsibilities are borne by the WLAN controller and MGW. Any WLAN system can securely identify and maintain a session with a WLAN endpoint using traditional associated communications mechanism. The MGW on the other hand, with its WWAN protocol (e.g., 3GPP protocol) abilities can interact with a WWAN subscriber database (e.g., HSS/3GPP AAA server). Throughout this application, a WiFi network is described as an example of a WLAN while a 3GPP network is described as an example of a WWAN network. However, it is not so limited; the techniques described herein can also be applied to other types of WLANs and/or WWANs.

According to one embodiment, the session management capability described herein combined with a scalable Wi-Fi radio access network (RAN) can provide a viable and cost effective solution to ever growing data tsunami. An embodiment of the invention presents a segmented session management approach to Wi-Fi interworking which as compared to the IWLAN removes the burden on running IPSec at the user device and at the same time provides a mechanism for seamless handover. One of main features of the embodiments is segmented session management. This solution applies this concept to a hybrid network consisting of a Wi-Fi) access network and a 3GPP network interworked through a MGW.

According to one embodiment, the proposed Wi-Fi integrated solution for mobile operators combines the features of a Wi-Fi network with that of a macro-cellular network and offers a compelling low cost option for expanded coverage. The solution leverages the native capabilities of a multi-access device augmented with a simple access management client. From a user's standpoint it provides a hassle free connection management and seamless mobility. Since the native data connection mechanism are used, it is also possible for handsets to benefit from an idle mode transition and preserve the battery life while maintain a packet data protocol (PDP) context. Finally the solution leverages the native security mechanism for each access (e.g., IEEE 802.1x/802.11i for a Wi-Fi network and a universal mobile telecommunications system (UMTS) authentication and key agreement (AKA) for a 3GPP network) and there is no additional security overhead. In other words a well-designed Wi-Fi access system can be integrated in a 3GPP network as a viable alternative RAN.

FIG. 1 is a block diagram illustrating an interworked WLAN and WWAN system according to one embodiment. Referring to FIG. 1, user equipment (UE) 101 is communicatively coupled to radio network controller (RNC) 109 of RAN 102. In order to access other networks such as Internet 107 and/or operator services node 108, UE 101 has to go through gateway device 115 and/or 3GPP packet core network 106. Typically, 3GPP packet core network 106 includes a serving GPRS support node (SGSN) 104 and a gateway GPRS support node (GGSN) 105. These support node SGSN and gateway node GGSN relay communications between a user terminal (or source mobile station) and a destination. Note that typically, there may be multiple SGSNs associated with a GGSN, multiple RNCs associated with a SGSN, and multiple UEs associated with an RNC in a hierarchical structure (not shown).

SGSN 104 and GGSN 105 include a function of relaying communications between a user terminal (or source mobile station) and a destination node (e.g. a server in the Internet or another mobile station). SGSN 104 effects data transmission between UE 101 and GGSN 105. For example, SGSN 104 collects up-link sessions from RNC 102 and distributes the down-link session delivered from GGSN 105 toward RNC 102. SGSN 104 manages a packet service between SGSN 104 and GGSN 105 by tunneling (e.g., GPRS tunneling protocol or GTP). SGSN 104 receives a subscriber profile stored in a home location register (HLR) and has therein at any time a copy thereof. The subscriber profile has information about the subscribed services (Internet, operator walled garden etc.)

GGSN 105 functions as a logical interface to an external data packet network such as Internet 107 and/or operator services node 108. GGSN 105 operates for coupling between core network 106 and such external packet data networks 107 and 108. More specifically, GGSN 105 collects up-link sessions from SGSN 104 and accesses Internet 107 and/or operator services 108. GGSN 105 in the 3GPP packet core network 106 sets up a tunnel down to SGSN 104 for down-link sessions.

UE 101 may be any of a variety of mobile devices, such as a Smartphone, tablet, a laptop, a gaming device, and/or a media device, etc., having the capability of communicating with MGW 115 via a variety of RANs. In one embodiment, UE 101 can also access MGW 115 via WLAN controller 110 of WLAN RAN 103. UE 101 can roam between RAN 102 and RAN 103 while maintaining the same communications session (e.g., mobility) with a remote entity such as operator service node 108 or server 111 of Internet 107, in which the mobility is managed by MGW 115. MGW 115 includes capability of offload Internet-bound traffic to Internet 107 without going through at least SGSN 104 of core network 106. MGW 115 is also referred to herein as a mobile data offload gateway (MDO-GW) device or Internet access offload gateway (IAO-GW) device for offloading traffic to Internet 107 without having to go through WWAN core network 106.

In one embodiment, MGW 115 is configured to interpret the control traffic flowing between UE/RNC and SGSN. Particularly, MGW 115 is configured to examine the control traffic to determine whether UE 101 is attempting to establish a communication path with the Internet 107 or operator services 108. If the traffic is for operator's services 108, both the control traffic and the associated data traffic are allowed to reach, via path 116, SGSN 104 for transfer to GGSN 105 in order to reach operator's services 108. In this scenario, the IP address (by which UE 101 is represented to the operator's services 108) is allocated by GGSN 105 and IP routers are configured to route all traffic destined to this IP address to GGSN 105 which in turn tunnels the data to UE 101 via SGSN 104 and RNC 102. Thus, MGW 115 does not interfere with the control traffic that is exchanged between UE 101 and the 3GPP packet core network 106 for registering UE 101 with the network 106, as well as the mutual authentication between UE 101 and network 106. If it is determined that the specific traffic flow is to be offloaded, MGW 115 directs that traffic to Internet 107 via path 117, bypassing SGSN 104 and/or GGSN 105 of 3GPP packet core network 106. Thus, only the selected traffic will be diverted directly to the Internet 107, while the rest of the traffic will be allowed to enter 3GPP packet core network 106.

Note that throughout this application, a 3G RAN and an RNC are used as an example of an access network and a gateway device. However, the present invention is not limited to use in network with these components. Other configurations may also be applied. For example, RAN 103 may be a femto cell while WLAN controller 110 may be a femto gateway device. Further detailed information concerning the offloading techniques of MGW 115 can be found in co-pending U.S. patent application Ser. No. 12/425,853, entitled "Method and System for Bypassing 3GPP Packet Switched Core Network when Accessing Internet from 3GPP UEs using 3GPP Radio Access Network," filed Mar. 31, 2009, which is incorporated by reference herein in its entirety.

Referring back to FIG. 1, for the purpose of illustration, according to one embodiment, Wi-Fi equipped UE 101 detects Wi-Fi access network and initiates 802.1x based authentication with WiFi controller 110. UE 101 can use any extensible authentication protocol (EAP) based authentication, such as EAP-subscriber identity module (EAP-SIM) and/or EAP-AKA protocols. A network access identifier (NAI) used in the IEEE 802.1x exchange contains the information identifying a mobile network operator (MNO) that informs an access point (AP) or WiFi controller 110 to initiate an EAP or a remote authentication dial-in user service (RADIUS) authentication session towards MGW 115. The EAP-AKA/EAP-SIM exchange may be completed against a 3GPP authentication, authorization, and accounting (AAA) server or home subscriber server (HSS) 120. If the MNO network does not have a 3GPP AAA server, MGW 115 can fulfill this role and interact with the associated HSS directly. Upon successful authentication, MGW 115 is configured to convey encryption keys securely to WiFi controller 110. At this point MGW 115 may also indicate whether WiFi controller 110 needs to initiate a GTP tunnel towards MGW 115 for carrying user traffic. As will be described in details further below, this lays the foundation for seamless mobility across a WLAN to a WWAN. In addition, it allows an operator to run analytics on all user traffic. As described above, the seamless mobility is perhaps the most important feature of cellular networks. Arguably, it is the ability to have continued service as the user moves makes the mobile service appealing. Technically speaking, mobility includes two key capabilities, wide area roaming and session handover. Both play important role in achieving the desired user experience. Wide area roaming means the ability to automatically discovers and secure access rights through a point of attachment to a network over the coverage area. For a data session, handover means changing the point of attachment while maintaining the same IP address and with minimal packet loss. In one embodiment, MGW 115 is configured to buffer packets received from UE 101 or from the network (e.g., Internet or core network) while the handover is being processed. Once the handover has been completed, MGW 115 is configured resume routing of the packets using the proper IP address. In mobile devices where power is at a premium, resetting connections or IP stack is undesirable since one ends up consuming more power for the same task.

According to one embodiment, when UE 101 moves in the WiFi coverage area 103, it would start the normal association and session establishment procedure with WiFi controller 110. As described above, during the WiFi session setup, MGW 115 can assign an IP address of its choice to WiFi capable UE 101. In one embodiment, MGW 115 communicates an IP address to the WLAN controller that was assigned to the user equipment during the active session of the WWAN, where this WWAN assigned IP address is used by WLAN controller 110 to identify the traffic to/from the UE 101 while WLAN controller 110 is communicatively coupled to the WLAN and tunnels that UE traffic between MGW 115 and WLAN controller 110.

For example, MGW 115 can assign an IP address allocated from its IP address pool if the session is to be offloaded to Internet 107 bypassing core network 106. Alternatively, MGW 115 can assign an IP address allocated by GGSN 105 if the session is to access core network 106. In order to provide seamless mobility, MGW 115 examines whether there is already a macro session (e.g., 3G session via 3G RAN 102 ongoing for the same user. If so, it assigns the same IP address and switches the data traffic to newly established GTP tunnel towards WiFi controller 110. WiFi controller 110 then maps this GTP session to an 802.11 session (e.g., WiFi session) towards UE 101. Specifically, for packets coming from the network side (e.g., core network 106 or Internet 107), WiFi controller 110 decapsulates the GTP packet and then encrypts the inner packet as per WiFi protocol (e.g., 802.11i protocol) and sends it towards UE 101. For the packets coming from UE 101, WiFi controller 110 is configured to decrypt the packet and then to encapsulate in a GTP packet towards MGW 115. MGW 115 has the ability to interface with external packet data networks including Internet 107. MGW 115 also serves as the anchor when UE 101 moves across Wi-Fi RAN 103 (also referred to as a micro network) and macro RAN 102.

According to another embodiment, when UE 101 moves out of Wi-Fi coverage 103 into 3G macro RAN 102, UE 101 may initiate an attach and session activation with core network 106. Since MGW 115 is located between RAN 102 and the core network 106, MGW 115 sees the signaling and detects that the incoming PDP activation is for a UE that is already active on Wi-Fi network 103, for example, based on the IMSI of the UE. This scenario applies to UE 101 waking up from an idle mode as well. By correlating these two paths towards UE 101, MGW 115 assigns the same IP address that has been assigned to the WiFi network session to the incoming 3G session. MGW 115 then switches onto the GTP data path towards the RNC 102. Since in most cases the macro network provides the wider umbrella coverage, in one embodiment, the PDP context may be preserved at UE 101 so that UE 101 does not go through unnecessary session set and tear down; rather UE 101 can use idle mode signaling. MGW 115 is also capable of correlating an idle session, which is useful for battery life preservation on the handset.

Figure 2:
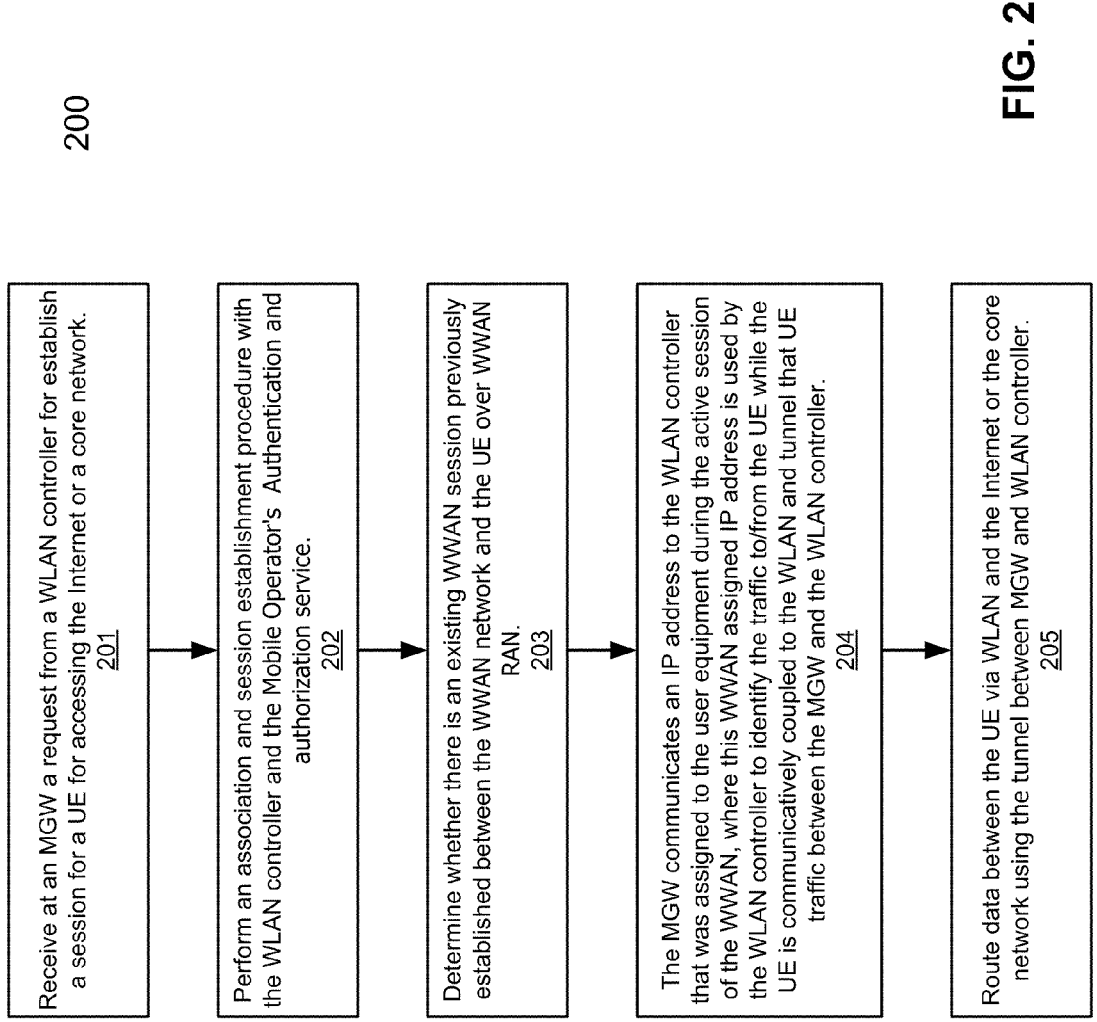
FIG. 2 is a flow diagram illustrating a method for seamlessly processing handover from a WWAN and a WLAN according to one embodiment of the invention.

FIG. 2 is a flow diagram illustrating a method for seamlessly processing handover from a WWAN and a WLAN according to one embodiment of the invention. For example, method 200 may be performed by MGW 115 of FIG. 1. Referring to FIG. 2, at block 201, an MGW receives a request from a WLAN controller (e.g., WiFi controller) for establish a session for a UE for accessing the Internet or a core network. At block 202, the MGW performs an association and session establishment procedure with the WLAN controller and an SGSN of the core network. At block 203, the MGW determines whether there is an existing WWAN session previously established between the MGW and the UE via a WWAN RAN. In one embodiment, the MGW examines an IP address mapping table maintained by the MGW (e.g., mapping table 500 of FIG. 5) to determine whether there is an active session associated with the UE based on a unique identifier, such as an IMSI, of the UE. If so, at block 204, the MGW communicates an IP address to the WLAN controller that was assigned to the user equipment during the active session of the WWAN, where this WWAN assigned IP address is used by the WLAN controller to identify the traffic to/from the UE while the UE is communicatively coupled to the WLAN and tunnel that UE traffic between the MGW and the WLAN controller. At block 205, the MGW routes data associated with the UE via the WLAN and the Internet or the core network using the assigned IP address.

FIG. 3 is a flow diagram illustrating a method for seamlessly processing handover from a WLAN and a WWAN according to one embodiment of the invention. For example, method 300 may be performed by MGW 115 of FIG. 1. Referring to FIG. 3, at block 301, an MGW receives a request for PDP activation from a RNC of a WWAN. At block 302, the MGW determines whether the PDP activation request was originated from a UE that already has an active WLAN session with the MGW. In one embodiment, the MGW examines an IP address mapping table maintained by the MGW (e.g., mapping table 500 of FIG. 5) to determine whether there is an active session associated with the UE based on a unique identifier, such as an IMSI, of the UE. At block 303, the MGW communicates an IP address to the WWAN controller that was assigned to the UE during the active session of the WLAN, where this WLAN assigned IP address is used by the WWAN controller to identify traffic to/from the UE while the UE is communicatively coupled to the WWAN and tunnel that UE traffic between MGW and WWAN controller. At block 304, a GTP session is established between the MGW and the RNC according to a PDP activation procedure. At block 305, MGW switches data of the WLAN session onto the GTP session with the RNC using the assigned IP address.

Figure 4A:
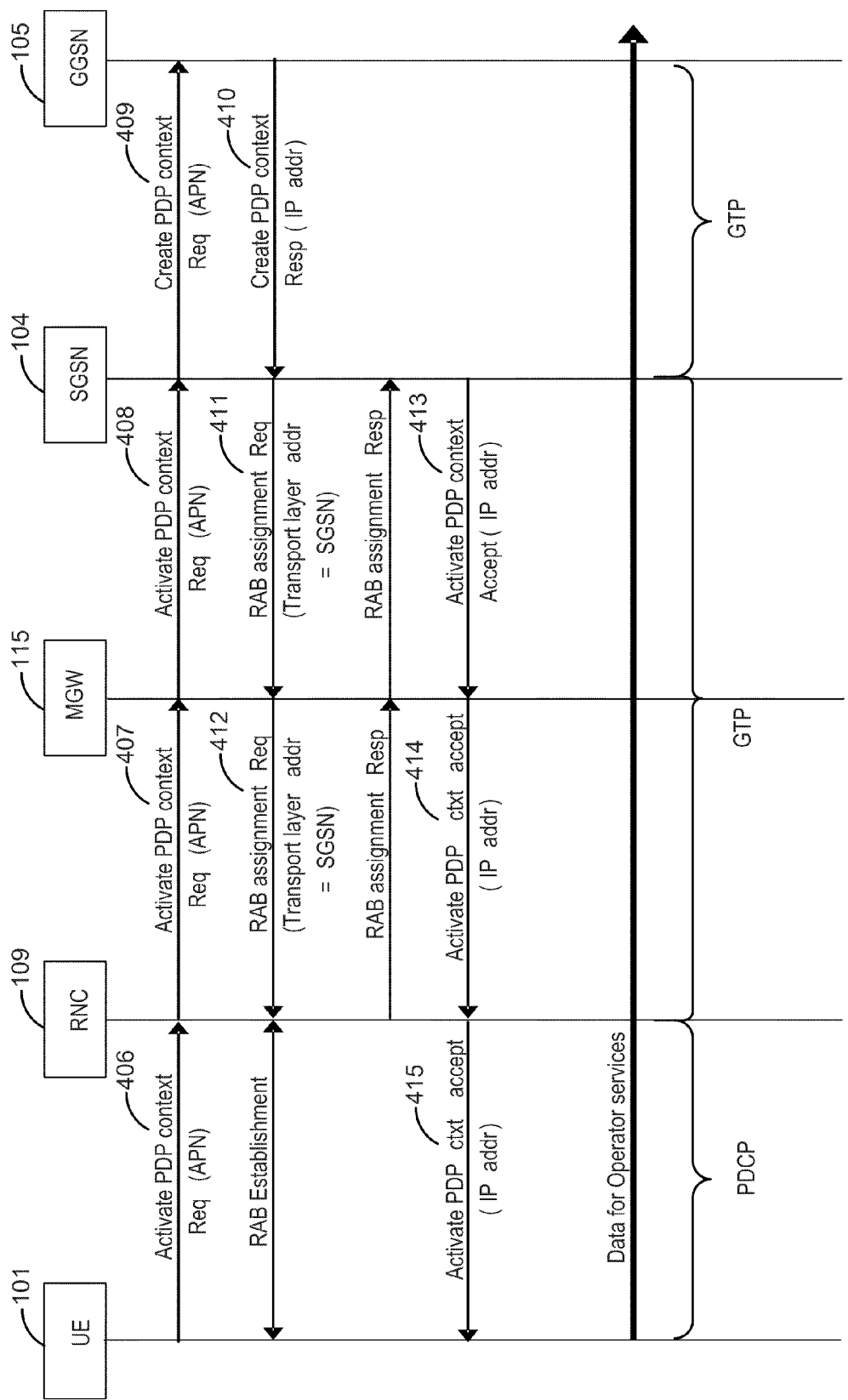
FIGS. 4A and 4B are transaction diagrams illustrating a processing flow for handling data packets according to certain embodiments of the invention.

FIG. 4A is a transaction diagram illustrating a processing flow for handling data packets according to one embodiment of the invention. In this case, the user requests for operator services (i.e. non-Internet services) and the MGW does not break out the traffic for the UE and send it directly to the Internet. Instead, traffic from the UE goes through an SGSN and GGSN. Referring to FIG. 4A, when UE 101 attempts to establish a connection to access a node of an external network such as Internet or operator's services node, UE 101 generates a PDP context request that contains an access point name (APN) and sends the request to RNC 109. PDP context request includes a PDP context which is a data structure present on both the SGSN and the GGSN which contains the subscriber's session information when the subscriber has an active session. When a UE wishes to use 3GPP data service, it first attaches and then activates a PDP context. This allocates a PDP context data structure in the SGSN that the subscriber is currently visiting and the GGSN serving the subscribers access point. The data recorded includes information regarding a subscriber's IP address, and subscriber's tunnel endpoint IDs (TEIDs) for SGSN and GGSN. In addition, an access point is selected and an APN is determined.

When MGW 115 receives the PDP context request forwarded from RNC 109 via transactions 406-407, MGW 115 determines whether such a request is for accessing the Internet by examining the associated APN. MGW 115 determines the connection to be established is not Internet bound and the associated APN identifies an operator's services or other traffic (e.g. Internet traffic) that an operator decided not to break out at MGW 115. In these cases, MGW 115 marks this session as non-IAO and relays the request without modification to SGSN 104 which sends the request to GGSN 105 via transactions 408-409.

In response to the request, GGSN 105 responds with an allocated IP address appropriate for the requested APN from its IP address pool and sends the response to SGSN 104 via transaction 410. In response the response, SGSN 104 sends a RAB (radio access bearer) assignment request to RNC 109, via MGW 115, having a transport layer address allocated by SGSN 104 via transactions 411-412. During transactions 411-412, again MGW 115 acts merely as a relay device. Once the RAB assignment has been completed, the activation of PDP context is completed via transactions 413-415 using an IP address allocated by GGSN 105. Thus, the session setup operations are performed during which MGW 115 acts as a relay device. As a result, a GTP tunnel is created between RNC 109 and SGSN 104 and subsequent data for the session is exchanged between RNC 109 and SGSN 104 via the GTP tunnel. That is, all traffic has to go through SGSN 104 and GGSN 105 of the 3GPP packet core network. The MGW 115 simply acts as a delay device.

Figure 4B:
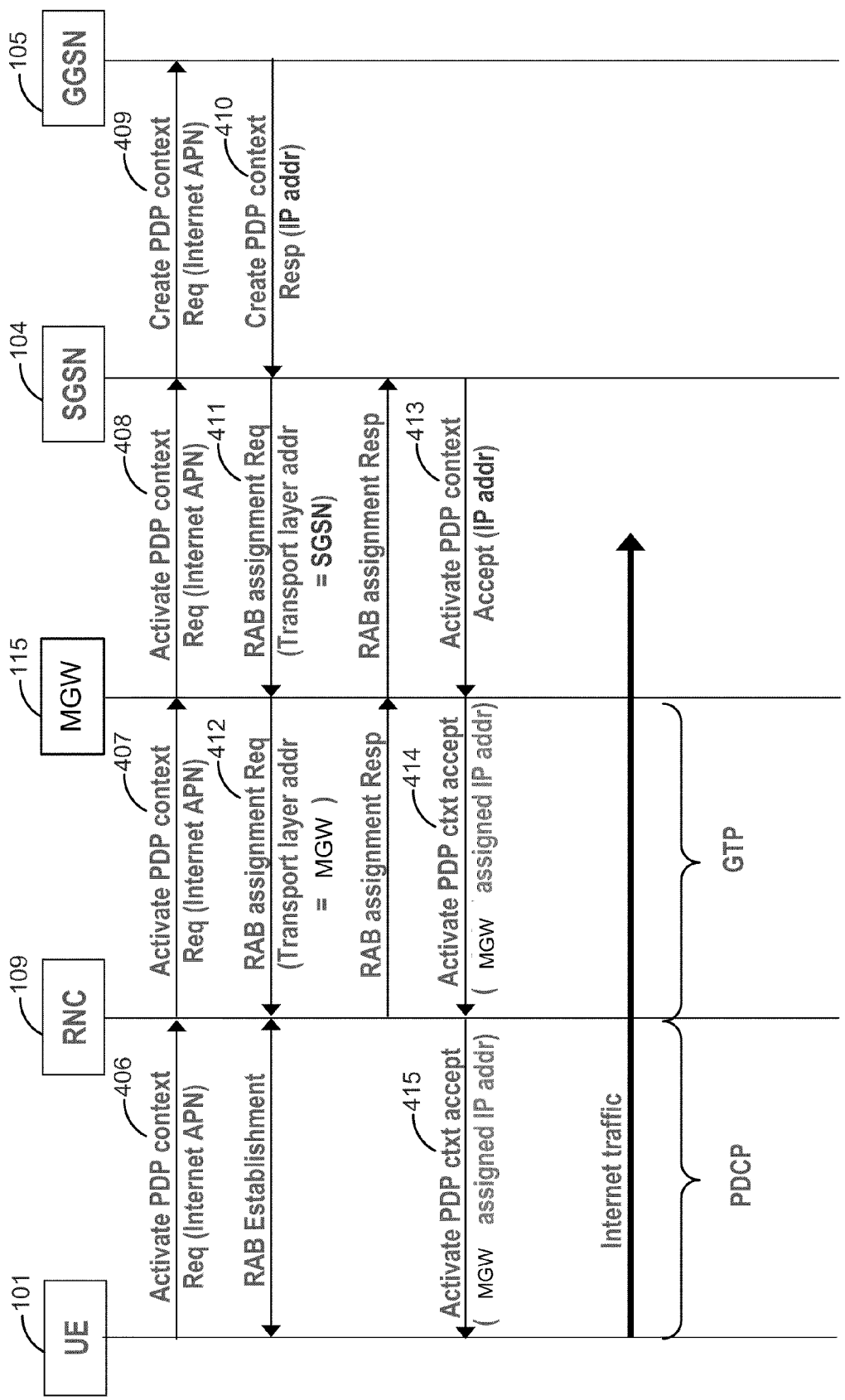

FIG. 4B is a transaction diagram illustrating a processing flow for handling control packets according to another embodiment of the invention. In this embodiment, when UE 301 sends a request to establish a connection and the request is received by MGW 303 via transactions 406-407, similar to the processing flow as shown in FIG. 4A, MGW 115 determines whether the request is for the Internet, for example, by examining the APN associated with the request. If it is determined that the request is for the Internet, when a request for RAB assignment is received from SGSN 104 via transaction 411, the MGW 115 is configured to replace a transport layer address allocated by SGSN 104 with the one allocated by MGW 115 during transaction 412. This, in effect, separates a control plane SGSN from a user plane SGSN as described in 3GPP specifications. Here, SGSN 104 becomes the control plane SGSN while the MGW 115 becomes the user plane SGSN. In addition, RNC 109 and SGSN 104 do not know this happening and thus, there is no impact on RNC 109 and SGSN 104. As a result, there is no need to change any settings at RNC 109 and SGSN 104.

Similarly, when MGW 115 receives a response from SGSN 104 via transaction 413 that accepts the activation of the PDP context, MGW 115 is configured to replace the IP address allocated by GGSN 105 with an IP address allocated internally by MGW 115 and sends the response to RNC 109. As a result, a GTP tunnel is created between RNC 109 and MGW 115, instead of RNC and SGSN as described in FIG. 4A, and subsequent Internet data for the session is exchanged between RNC 109 and MGW 115. This in effect has the same effect as separating a control plane GGSN from a user plane GGSN. Here GGSN 105 becomes the control plane GGSN while MGW becomes the user plane GGSN that assigns the user IP address. This mechanism is similar to how some GGSNs are implemented for load sharing in a chassis. There is no change needed for RNC 109, SGSN 104, or GGSN 105 under this configuration. Further detailed information concerning the processes with respect to FIGS. 4A and 4B can be found in the above incorporated-by-reference application.

In addition, according to one embodiment, MGW 115 maintains mapping between the IP address allocated by GGSN 105 and the IP address allocated internally by MGW 115, which may be stored in a mapping data structure similar to one as shown in FIG. 5. Referring to FIGS. 1 and 5, for each active session of each UE identified by its unique identifier such as an international mobile subscriber identifier (IMSI), data structure 500 (also referred to as a mapping table) includes an entry created and maintained throughout the life of the active session. Each entry includes, but is not limited to, first field 501 for storing its IMSI, second field 502 for storing a NAI associated with the UE, third field 503 for storing an IP address assigned by MGW (also referred to herein as an MGW IP address), and fourth field 504 for storing an IP address associated with the SGSN (allocated by the associated GGSN), also referred to herein as an SGSN IP address.

In one embodiment, SGSN IP address 504 can be captured by MGW 115 and stored in field 504, when MGW 115 receives a RAB assignment request from SGSN 104 in response to the RAB assignment request during transaction 411 of FIG. 4B. In addition, MGW IP address 503 is allocated from an IP address pool and stored in field 503. MGW IP address 503 can be used by MGW 115 to offload data traffic onto Internet 107 bypassing core network 106 as described above. Subsequently, when MGW 115 receives a request from the same UE from a WiFi RAN 103 to attach to the network, MGW 115 examines data structure 500 to determine whether there is an existing entry associated with the IMSI of the UE. If so, the same MGW IP address 503 or SGSN IP address 504 is assigned to the UE dependent upon whether the session is destined to the Internet or the core network, which can be used to exchange communications with the UE via WiFi RAN 103. In one embodiment, the MGW communicates an IP address to the WLAN controller that was assigned to the user equipment during the active session of the WWAN, where this WWAN assigned IP address is used by the WLAN controller to identify the traffic to/from the UE while the UE is communicatively coupled to the WLAN and tunnel that UE traffic between the MGW and the WLAN controller. Note that during the authentication and attachment processes, a different SGSN IP address may be allocated from GGSN 105. In this situation, MGW 115 can simply update field 504 with the new SGSN IP address, which may be used for the UE to access core network 106.

Figure 6:
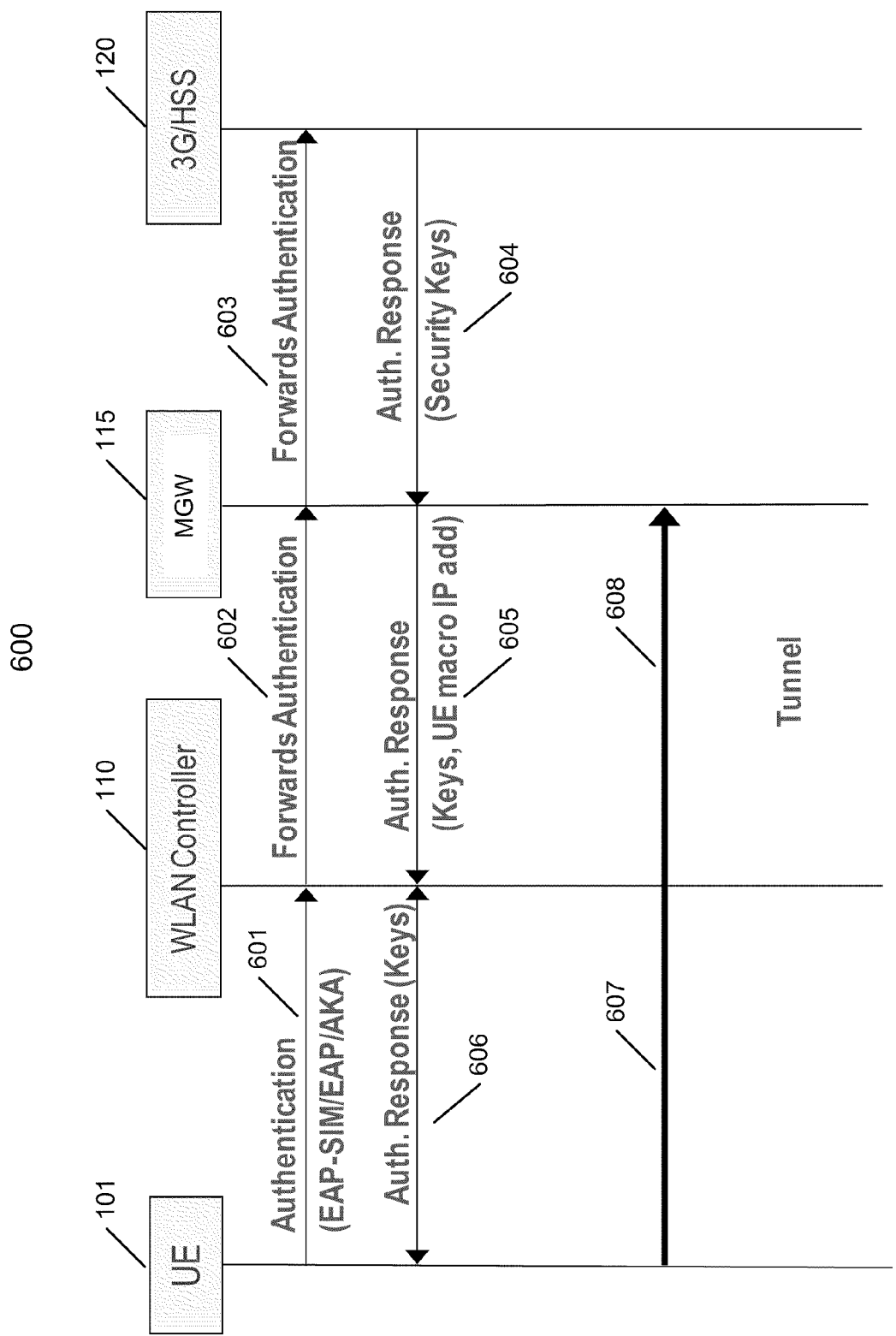
FIG. 6 is a transaction diagram illustrating a processing flow for handling control packets according to another embodiment of the invention.
Figure 7:
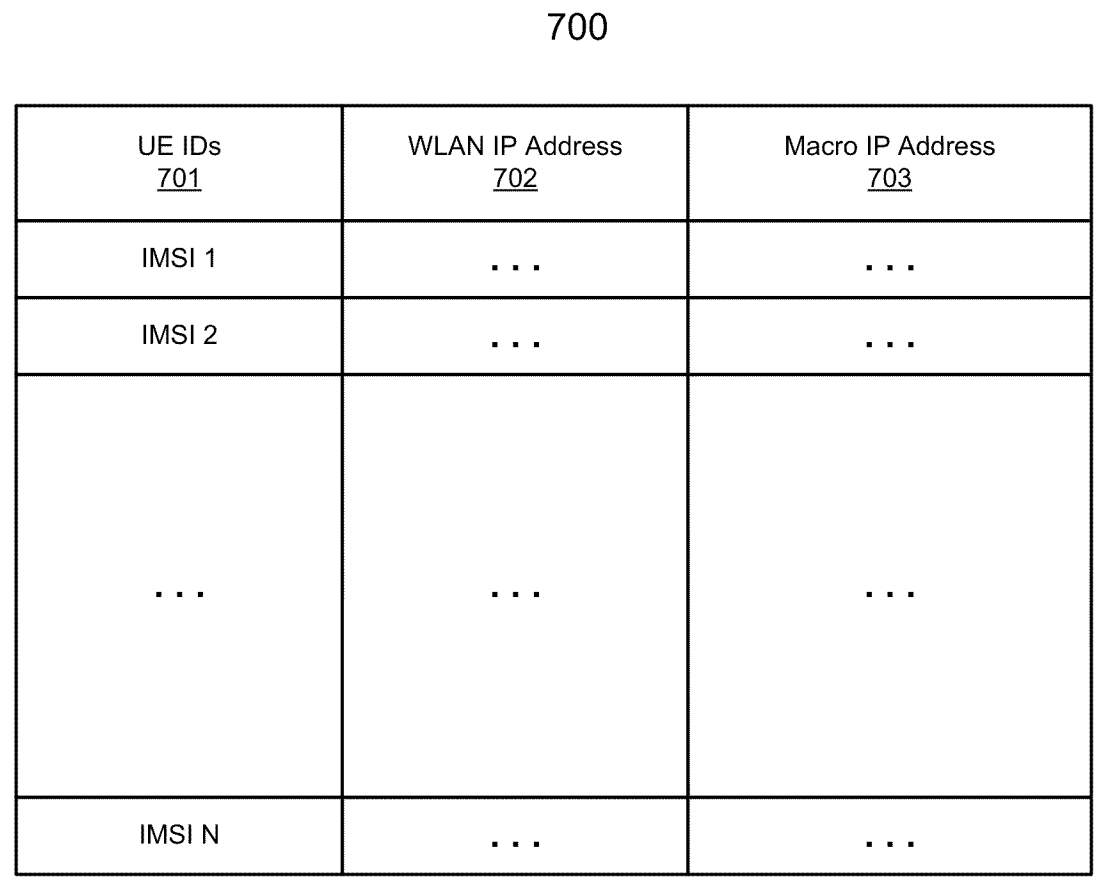

FIG. 6 is a transaction diagram illustrating a processing flow for handling control packets according to another embodiment of the invention. Transactions 600 may be performed when a UE is attached to a WLAN such as a WiFi network. Referring to FIG. 6, when UE 101 roams to a WLAN RAN (e.g., WLAN RAN 103 of FIG. 1), UE 101 initiates WLAN based authentication (e.g., IEEE 802.1x) with WLAN controller 110 during transaction 601. For example, for WiFi, UE 101 can use EAP_SIM or EAP-AKA based authentication protocol. Based on a NAI obtained from transaction 601, WLAN controller 110 identifies MGW 115 that is associated with the corresponding WLAN. In addition, WLAN controller 110 creates an entry in a mapping table such as mapping table 700 as shown in FIG. 7 to store WLAN IP address 702 allocated by WLAN controller 110 to communicate with UE 101 over the WLAN. The entry associated with UE 101 is identified the associated IMSI 701.

During transaction 602, WLAN controller 110 forwards the authentication request to MGW 115 which is identified by the NAI. MGW 115 is configured to store the NAI information in its mapping table as described above. In particularly, MGW 115 examines the mapping table (e.g., data structure 500 of FIG. 5) maintained by MGW 115 to determine whether there is an existing entry for UE 101 based on the IMSI of UE 101. If not, a new entry is created for UE 101; otherwise, the NAI information is stored in the corresponding entry. In addition, any user traffic is buffered by MGW 115 if there is an existing entry for UE 101. At transaction 603, MGW 115 communicates with AAA/HSS server 120 to authenticate UE 101.

When UE 101 has been successfully authenticated by AAA/HSS 120, at transaction 604, an authentication response is received at MGW 115 including the associated security keys. In addition, MGW 115 communicates with the SGSN and GGSN to allocate a macro network IP address such as SGSN IP address. Further, if there is an existing entry in the mapping table (e.g., table 500 of FIG. 5) maintained within MGW 115, MGW 115 assigns the same MGW IP address from the entry to UE 101; otherwise, a new MGW IP address is allocated and assigned. At transaction 605, MGW 115 forwards the authentication response to WLAN controller 110, including the security keys received from AAA/HSS 120 and a macro IP address, which can be one of the MGW IP address assigned by MGW 115 and the SGSN IP address allocated by the GGSN.

In response, WLAN controller 110 is configured to store the macro IP address in its mapping table (e.g., as macro IP address 703 of mapping table 700 of FIG. 7). At transaction 606, WLAN controller 110 forwards the authentication response to UE 101, using a WLAN IP address allocated by WLAN controller 110. Subsequently, WLAN controller 110 creates a tunnel with MGW 115 to route traffic of UE 101. In particular, when WLAN controller 110 receives, via transaction 607, traffic form UE 101 using the associated WLAN IP address, WLAN controller 110 is configured to examine the corresponding entry associated with UE 101 in its mapping table (e.g., mapping table 700 of FIG. 7) to determine the macro IP address (e.g., either MGW IP address or SGSN IP address). WLAN controller 110 then tunnels, via transaction 608 the traffic to MGW 115 using the macro IP address. The source IP address of the tunneled packet is specified as the macro IP address obtained from mapping table 700, either MGW IP address or SGSN IP address. In response, MGW 115 route the traffic accordingly, for example, breaking out to Internet if the source IP address is the MGW IP address or to core network if the source IP address is the SGSN IP address.

Figure 10:
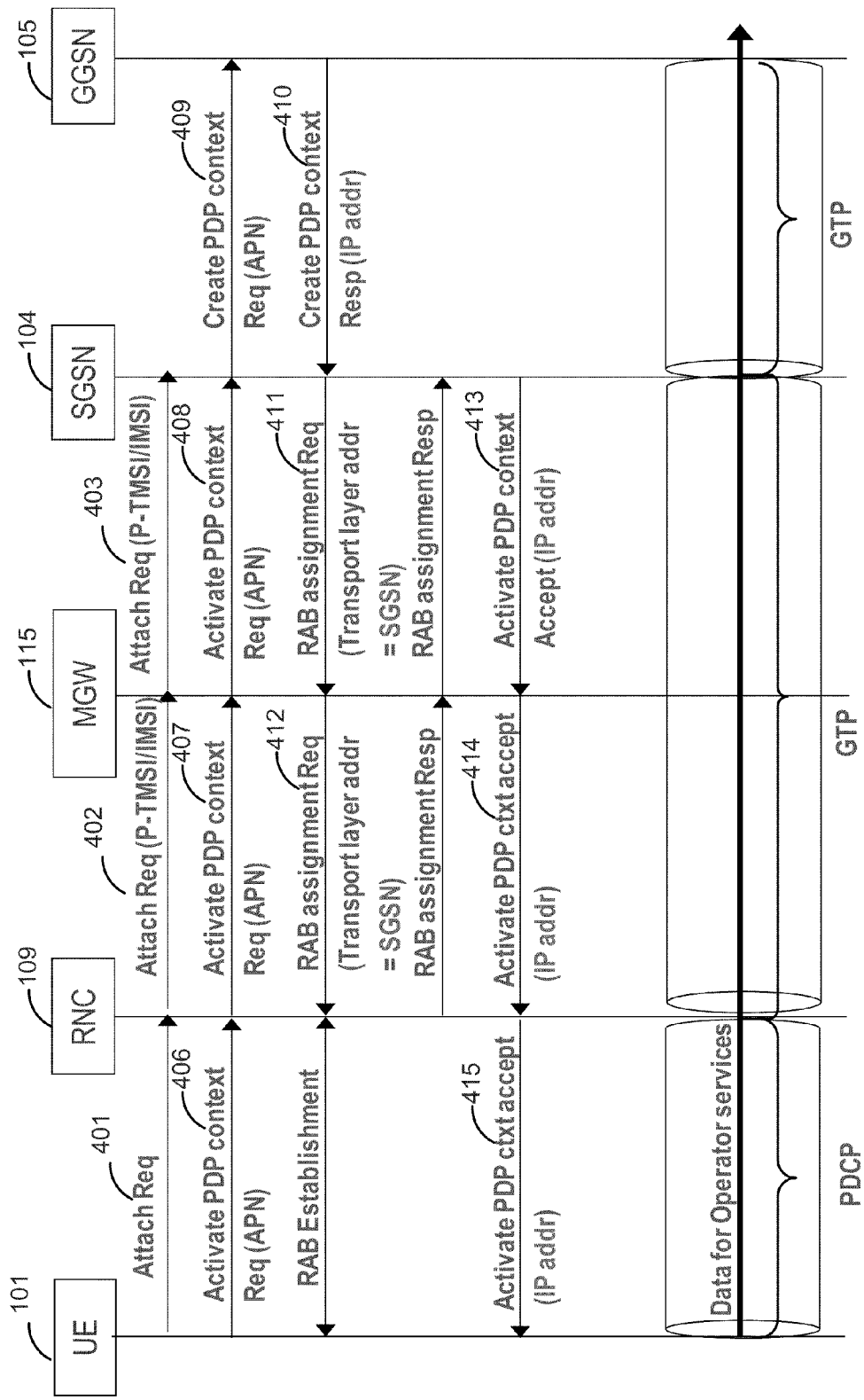
FIG. 10 is a transaction diagram illustrating a processing flow for handling data packets according to another embodiment of the invention.

As described above, an MGW has the capability of buffering any user traffic that is received from the UE via a WLAN controller (e.g., uplink traffic) and/or 3G controller or from the network such as Internet or the core network (e.g., downlink traffic). FIG. 10 is a transaction diagram illustrating an example of a process when a UE switches from WLAN to 3G RAN. Referring to FIG. 10, when UE 101 attaches to a 3G RAN, during transaction 401, UE 101 initiates an attach request to RNC 109, which is forwarded by RNC 109 to MGW 115 via transaction 402. In response, MGW 115 is configured to identify that there is an active session of WLAN associated with UE 101, for example, based on IMSI of UE 101 via IP address mapping table 500 of FIG. 5. In addition to forwarding the attach request to SGSN 104 via transaction 403, MGW 115 is configured to buffer any uplink traffic received from RNC 109 and/or the WLAN controller in the previous active WLAN session and buffer any downlink traffic received from the Internet or SGSN 104.

Thereafter, the normal session activation processes are performed as described above with respect to FIGS. 4A and 4B. Once the new macro IP address has been allocated from GGSN during transaction 413, the IP address mapping table maintained by MGW 115 is updated in view of the new macro IP address. In addition, MGW 115 is configured to resume delivery of the buffered uplink and downlink data accordingly.

Figure 8:
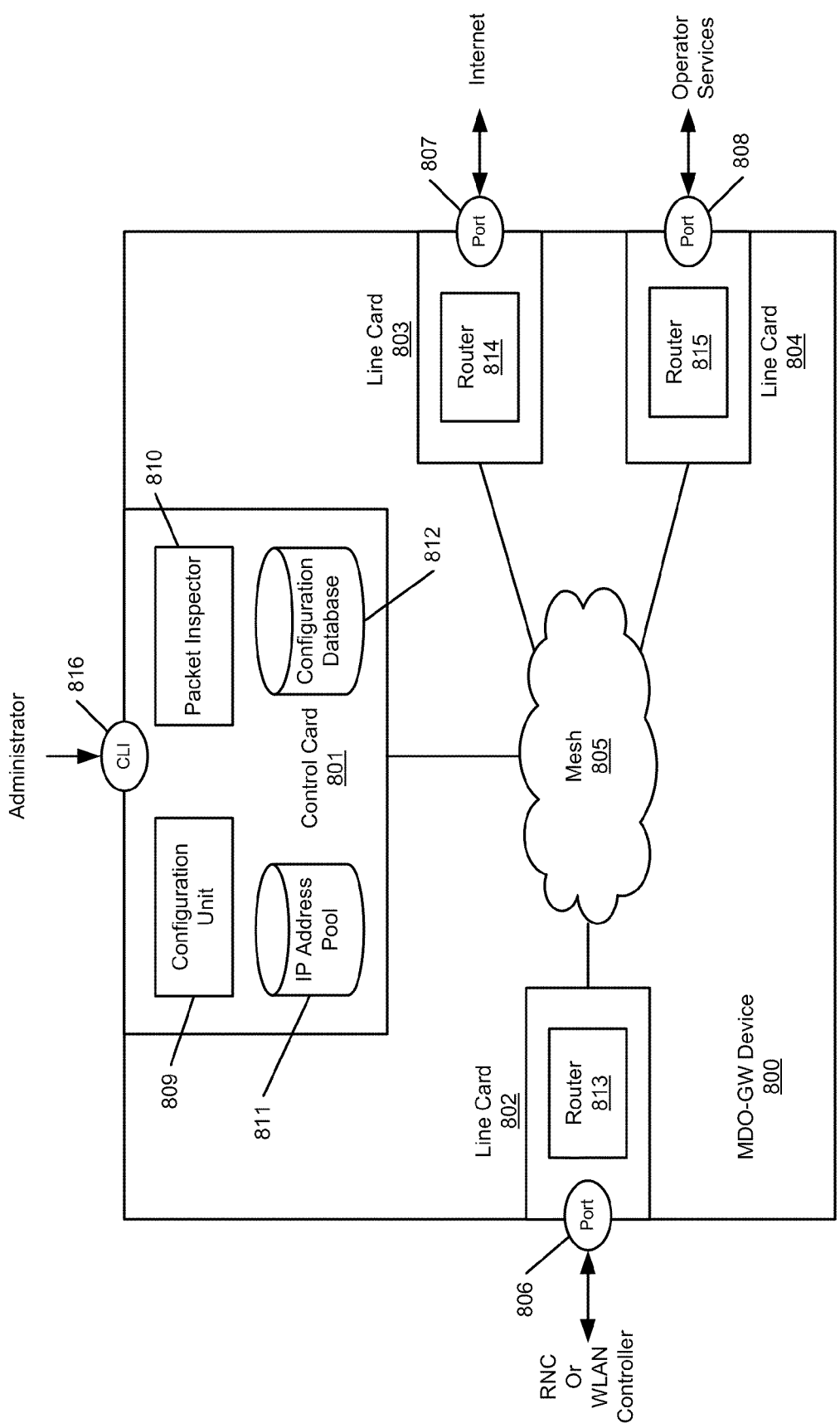
FIG. 8 is a block diagram illustrating a mobility gateway device according to one embodiment of the invention.

FIG. 8 is a block diagram illustrating a mobility gateway device according to one embodiment of the invention. For example, MGW 800 may be implemented as a part of MGW 115 of FIG. 1. Referring to FIG. 8, MGW 800 includes, but is not limited to, a control card 801 (also referred to as a control plane) communicatively coupled to one or more line cards 802-804 (also referred to as interface cards or user planes) over a mesh 805, which may be a mesh network, an interconnect, a bus, or a combination thereof. Each of the line cards 803-804 is associated with one or more interfaces (also referred to as ports), such as interfaces 806-808 respectively. Each line card includes routing functional block (e.g., blocks 813-815) to route packets via the corresponding interface according to a configuration (e.g., routing table) configured by control card 801. For the purpose of illustration, it is assumed that interface 806 is to be coupled to an RNC of a RAN or a WLAN controller of a WLAN; interface 807 is to be coupled to the Internet; and interface 808 is to be coupled to SGSN of a 3GPP packet core network for operator services.

According to one embodiment, control card 801 includes a configuration unit 809, a packet inspector 810, an IP address pool database 811, and a configuration database 812. In one embodiment, database 812 is used to store information regarding which APNs of which the traffic should be diverted to the Internet directly bypassing the 3GPP packet core network. In addition, database 812 may also be utilized to store the mapping table for the IP addresses such as data structure 500 of FIG. 5. At least a portion of information stored in database 812 may be pushed down to line cards 802-804, for example, as part of a routing table (not shown). As described above, an administrator can configure or specify via a User Interface (e.g. command line interface (CLI)) 816 which APNs for the purpose of Internet breakout. Through User Interface 816, the administrator can also enable and/or disable a specific APN for Internet breakout purposes (e.g., by removing or adding APNs)

Packet inspector 810 is configured to inspect session initiation request control packets to establish a connection to determine whether the traffic is to be Internet bound by comparing the APN values provided in the request and the APNs stored/configured in database 812. If so, the configuration unit 809 may perform a process similar to the one as shown in FIG. 4B, including replacing certain IP addresses from its own IP address pool 811. Based on the configuration set up by control card 801, a packet router functional block of each line card is configured to route the corresponding data packets to the Internet directly, for example, via interface 807, bypassing the 3GPP packet core network. Otherwise, if configuration unit 809 determines that a packet is destined for the 3GPP packet core network, the packet router would route the packet to the 3GPP packet core network, for example, via interface 808.

Note that some of the functionality of control card 801 may be delegated or replicated to a line card. For example, certain information of database 812 may be replicated to line cards 802-804 and stored in a storage location (not shown) within line cards 802-804. Also note that some or all of the components as shown in FIG. 8 may be implemented in hardware, software, or a combination of both.

Figure 9:
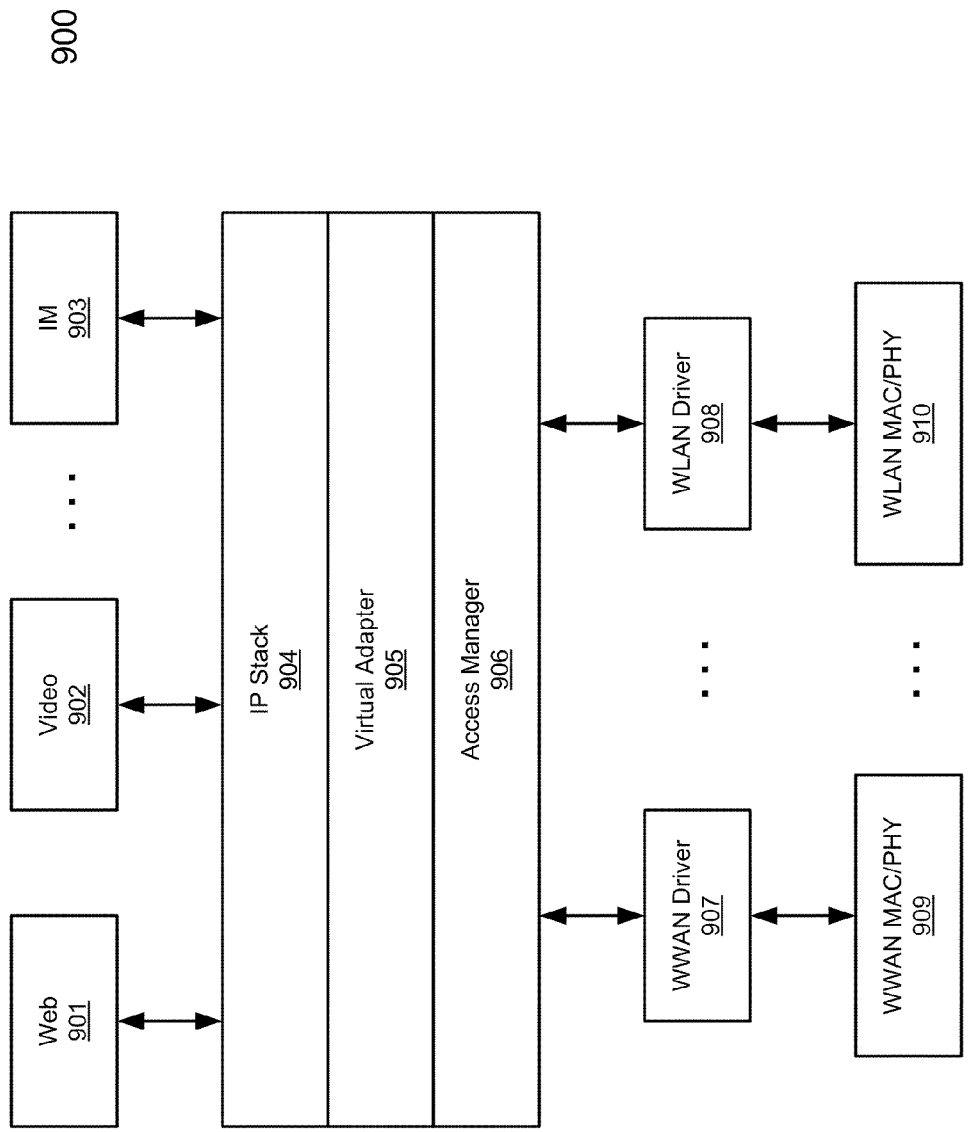
FIG. 9 is a block diagram illustrating architecture of a multi-access user device according to one embodiment of the invention.

FIG. 9 is a block diagram illustrating architecture of a multi-access user device according to one embodiment of the invention. For example, system 900 may be implemented as part of UE 101 of FIG. 1. Referring to FIG. 9, system 900 includes, but is not limited to, one or more applications 901-903 as clients communicatively coupled to IP stack 904. IP stack 904 is communicatively coupled to virtual adapter 905, which is supported by a variety of operating systems. Access manager 906 is responsible for selecting a suitable access network, for example, a 3G network via WWAN driver 907 and its associated media access control (MAC) and physical (PHY) layer 909, or a WLAN network via WLAN driver 908 and its associated MAC/PHY layer 910.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable medium. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description above. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:
1. A machine-implemented method for processing network traffic of a packet network, the method comprising:
receiving, at a mobility gateway device (MGW), a request from a wireless local area network (WLAN) controller of a WLAN for accessing the Internet or a packet core network, the request originated from a user equipment (UE) communicatively coupled to the WLAN;

in response to the request, determining by the MGW whether there is an active session associated with the UE over a wireless wide area network (WWAN); and communicating by the MGW an IP address to the WLAN controller that was assigned to the UE during the active session of the WWAN, wherein the WWAN assigned IP address is used by the WLAN controller to identify traffic to/from the user equipment while the UE is communicatively coupled to the WLAN and tunnel the UE traffic between MGW and WLAN controller.

2. The method of claim 1, further comprising:

in response to the request, buffering within the MGW uplink traffic received from a WWAN controller during the active WWAN session and downlink traffic received from the Internet or the core network; and resuming delivering the buffered uplink and downlink traffic after a session between the MGW and the WLAN controller has been established.

3. The method of claim 1, wherein the MGW is configured to interface the WLAN and WWAN with the Internet and the packet core network, and wherein the UE is capable of communicating with the WWAN and WLAN using appropriate communications protocols, and wherein the UE is roaming from the WWAN to the WLAN.

4. The method of claim 1, wherein determining whether there is an active session associated with the UE over the WWAN comprises examining an IP address mapping table maintained within the MGW to locate an entry based on an international mobile subscriber identifier (IMSI) of the UE, wherein the active session of the WWAN exists if the entry can be located from the IP address mapping table.

5. The method of claim 4, wherein the entry contains the assigned IP address, which was assigned to the UE during the active session of the WWAN and stored in the entry by the MGW.

6. The method of claim 4 wherein the IP address is allocated from an IP address pool maintained by the MGW, and wherein the MGW is configured to offload data traffic of the UE from the WLAN or WWAN to the Internet using the IP address without having to go through a serving GPRS support node (SGSN) of the packet core network using the assigned IP address.

7. The method of claim 4, wherein the IP address is allocated by a gateway GPRS support node (GGSN) of the packet core network, and wherein the MGW is configured to route all traffic of the UE from the WLAN or WWAN to a serving GPRS support node (SGSN) of the packet core network using the assigned IP address.

8. A network element, comprising:

an interface to receive a request from a wireless local area network (WLAN) controller of a WLAN for accessing the Internet or a packet core network, the request originated from a user equipment communicatively coupled to the WLAN; and a configuration unit, in response to the request, to determine whether there is an active session associated with the UE over a wireless wide area network (WWAN) and to communicate with the WLAN controller, the IP address that was assigned to the UE during the active session of the WWAN, wherein the assigned IP address is used by the WLAN controller to identify the traffic associated with the UE based on the WWAN assigned IP address and tunnel that traffic from the WLAN controller of the WLAN and the Internet or the packet core network using the assigned IP address.

9. The network element of claim 8, further comprising:

in response to the request, buffering within the MGW uplink traffic received from a WWAN controller during the active WWAN session and downlink traffic received from the Internet or the core network; and resuming delivering the buffered uplink and downlink traffic after a session between the MGW and the WLAN controller has been established.

10. The network element of claim 8, wherein the MGW is configured to interface the WLAN and WWAN with the Internet and the packet core network, and wherein the UE is capable of communicating with the WWAN and WLAN using appropriate communications protocols, and wherein the UE is roaming from the WWAN to the WLAN.

11. The network element of claim 8, further comprising a storage device having an IP address mapping table stored therein, wherein in determining whether there is an active session associated with the UE over the WWAN, the configuration unit is configured to examine the IP address mapping table to locate an entry based on an international mobile subscriber identifier (IMSI) of the UE, wherein the active session of the WWAN exists if the entry can be located from the IP address mapping table.

12. The network element of claim 11, wherein the entry contains the assigned IP address, which was assigned to the UE during the active session of the WWAN and stored in the entry by the MGW.

13. The network element of claim 11, wherein the storage device further includes an IP address pool stored therein, wherein the IP address is allocated from the IP address pool, and wherein the router is configured to offload data traffic of the UE from the WLAN or WWAN to the Internet using the assigned IP address without having to go through a serving GPRS support node (SGSN) of the packet core network.

14. The network element of claim 11, wherein the IP address is allocated by a gateway GPRS support node (GGSN) of the packet core network, and wherein the router is configured to route all traffic of the UE from the WLAN or WWAN to a serving GPRS support node (SGSN) of the packet core network using the assigned IP address.

15. A non-transitory computer-readable storage medium storing instructions therein, which when executed by a processor, cause the processor to perform a method for processing network traffic of a data network, the method comprising:

receiving, at a mobility gateway device (MGW), a request from a wireless local area network (WLAN) controller of a WLAN for accessing the Internet or a packet core network, the request originated from a user equipment (UE) communicatively coupled to the WLAN;

in response to the request, determining by the MGW whether there is an active session associated with the UE over a wireless wide area network (WWAN); and communicating by the MGW an IP address to the WLAN controller that was assigned to the UE during the active session of the WWAN, wherein the WWAN assigned IP address is used by the WLAN controller to identify traffic to/from the UE while the UE is communicatively coupled to the WLAN and tunnel that UE traffic between MGW and WLAN controller.

16. A machine-implemented method for processing network traffic of a packet network, the method comprising:

receiving, at a mobility gateway device (MGW), a request from a wireless wide area network (WWAN) controller of a WWAN for accessing the Internet or a packet core network, the request originated from a user equipment (UE) communicatively coupled to the WWAN;

in response to the request, determining by the MGW whether there is an active session associated with the UE over a wireless local area network (WLAN); and communicating by the MGW an IP address to the WWAN controller that was assigned to the UE during the active session of the WLAN, wherein this WLAN assigned IP address is used by the WWAN controller to identify traffic to/from the UE while the UE is communicatively coupled to the WWAN and tunnel that UE traffic between MGW and WWAN controller.

17. The method of claim 16, further comprising:

in response to the request, buffering within the MGW uplink traffic received from a WLAN controller during the active WLAN session and downlink traffic received from the Internet or the core network; and resuming delivering the buffered uplink and downlink traffic after a session between the MGW and the WWAN controller has been established.

18. The method of claim 16, wherein the MGW is configured to interface the WLAN and WWAN with the Internet and the packet core network, and wherein the UE is capable of communicating with the WWAN and WLAN using appropriate communications protocols, and wherein the UE is roaming from the WWAN to the WLAN.

19. The method of claim 16, wherein determining whether there is an active session associated with the UE over the WWAN comprises examining an IP address mapping table maintained within the MGW to locate an entry based on an international mobile subscriber identifier (IMSI) of the UE, wherein the active session of the WWAN exists if the entry can be located from the IP address mapping table.

20. The method of claim 19, wherein the entry contains the assigned IP address, which was assigned to the UE during the active session of the WWAN and stored in the entry by the MGW.

* * * * *